United States Patent [19]

Gash et al.

[11] 3,883,589

[45] May 13, 1975

[54] PREPARATION OF MONOHALOACYL HALIDES

[75] Inventors: Virgil W. Gash; Donald E. Bissing, both of Ballwin, Mo.

[73] Assignee: Monsanto Company, St. Louis, Mo.

[22] Filed: July 16, 1973

[21] Appl. No.: 379,899

[52] U.S. Cl. ......................... 260/544 Y; 260/544 M
[51] Int. Cl. ...................... C07c 51/58; C07c 50/20
[58] Field of Search .................... 260/544 Y, 544 M

[56] References Cited
UNITED STATES PATENTS
2,862,964  12/1958  Lacey ............................ 260/544 Y 3,763,250  10/1973  Rai et al. .................. 260/544 Y X

*Primary Examiner*—Lorraine A. Weinberger
*Assistant Examiner*—Richard D. Kelly
*Attorney, Agent, or Firm*—William I. Andress; John L. Young; Donald W. Peterson

[57] ABSTRACT

A process for the preparation of monohaloacyl halides by halogenating ketenes in the presence of a tertiary phosphate ester.

19 Claims, No Drawings

PREPARATION OF MONOHALOACYL HALIDES

This invention relates to the preparation of monohaloacyl halides by the liquid phase halogenation of ketenes. More particularly, this invention relates to the halogenation of ketenes in the presence of a solvent or a reaction medium that inhibits or prevents the formation of polyhaloacyl halides and minimizes the formation of acyl halides. The term "halogenating agent" as used herein includes chlorine, bromine, iodine monochloride, iodine monobromide, bromine monochloride and the like.

The liquid phase halogenation of ketene is well known but the previously known methods of conducting this reaction have resulted in the formation of monohaloacetyl halides contaminated with a considerable proportion of dihaloacetyl halides and polyhalogenated by-products. These earlier methods utilized such solvents as chlorinated benzenes, nitrobenzene, carbon tetrachloride, chloroacetyl chloride, acetyl chloride, 1,2-dichloroethane, acetonitrile, benzonitrile, nitromethane and various other solvents. Each of these solvents had a common shortcoming; that is, they all resulted in the formation of a considerable amount of dihaloacetyl halide, together with the desired product, monohaloacetyl halide. In some of these solvents, the undesired trihaloacetyl halides were also formed. The dihalo derivatives have no commercial utility and their separation from the monohalo derivative is expensive and time consuming. For example, dichloroacetyl chloride has a boiling point of approximately 107°C whereas monochloroacetyl chloride has a boiling point of about 105°C. This proximity of the boiling points of these two compounds renders their separation exceedingly difficult and also adds an expensive and uneconomical step to the halogenation process when utilized in the previously know solvents.

The monohaloacyl halides produced by the process of this invention are valuable intermediates in the production of herbicidal alpha-haloacetanilides and other products. By contrast, the corresponding di- and trihaloacyl halides have no commercial significance. In other words, they are present merely as diluents which detract from the efficacy of the commercially valuable monohaloacyl halides. The severity of the problem is evidenced by the fact that all commercially available chloroacetyl chloride is contaminated with appreciable amounts of dichloroacetyl chloride, and in some instances the dichloroacetyl chloride content is as great as six percent.

In accordance with the present invention, the disadvantages of the prior art solvents are overcome by the halogenation of a ketene in the presence of a solvent of the formula

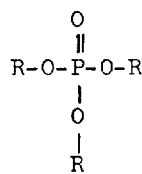

wherein each R is independently alkoxyalkyl, alkyl, substituted alkyl, phenyl, or substituted phenyl or two R's when taken together are alkylene of the empirical formula $C_nH_{2n}$ wherein $n$ is an integer from 2 through 8, inclusive, and having from two through four carbons, inclusive, in a continuous chain.

The process of the present invention encompasses the halogenation of ketene, i.e., $CH_2=C=O$, as well as substituted ketenes, such as methyl ketene, dimethyl ketene, ethyl ketene, diethyl ketene, phenyl ketene, diphenyl ketene, and the like.

Preferred alkoxyalkyl are those groups wherein the aliphatic chains are straight or branched and contain a combined total of from two through eight carbons inclusive. Preferred alkyl are straight or branched aliphatic chains having from one through eight carbons, inclusive.

A preferred substituted alkyl group has the formula $-C_xH_{2x-y+1}R^1_y$ wherein $R^1$ is halo, phenyl, or substituted phenyl, $x$ is an integer from 1 through 8, inclusive, and $y$ is an integer from 1 through 3, inclusive. It is more preferred that when $R^1$ is phenyl then $y$ is 1 and when $x$ is 1 and $y$ is 3 then $R^1$ is halo.

A preferred substituted phenyl group has the formula

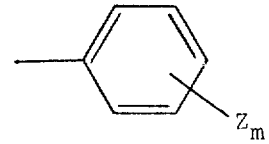

wherein each Z is independently halo, trihalomethyl, cyano, nitro, lower alkyl or lower alkoxy, and $m$ is an integer from 1 through 3, inclusive, provided that when each Z is nitro, $m$ cannot exceed 2. Preferred Z groups are halo, nitro, lower alkyl, trifluoromethyl and lower alkoxy.

As employed herein, the terms "lower alkyl" and "lower alkoxy" designate those groups wherein the aliphatic chain is straight or branched and has from one through five carbons inclusive.

The term "halo" designates a halogen atom selected from fluorine, chlorine, bromine and iodine.

In carrying out the process of the present invention, the ketene and the halogenating agent are introduced into the solvent medium where they react to form monohaloacyl halides which are separated from the reaction medium by conventional means such as distillation, preferably at reduced pressure. The process is amenable to either continous or to batch type operation. The operating conditions under which the reaction is conducted are not critical but it is preferred to maintain them within specified limits to maximize the yield of the monohaloacyl halides. In essence, it is only necessary that the reaction mass is liquid under reaction conditions. Because of practical considerations, however, the reaction is normally conducted within the approximate temperature range of −50°C to 150°C at a pressure from about 50 mm. Hg to about 2 atmospheres. In most instances, however, it is more preferred to operate in a continuous mode at a temperature about 0°C and about 110°C at a pressure between about 100 mm. and about 760 mm. In a batch process it is more preferred to operate in this temperature range at a pressure between about 50 mm. and 760 mm. The reaction of the halogenating agent and the ketene will progress to form substantially pure monohaloacyl halides regardless of the mole ratio of the reactants. The advantages of the present invention are more fully realized, however, when the mole ratio of halogenating agent to ketene is maintained between about 0.8:1 and about 2.0:1 and optimum results are obtained with mole ratios of halogenating agent to ketene between about 1:1 and about 1.3:1. The presence of solvent of the present invention in the reaction mass minimizes the formation of acyl halides and substantially eliminates the formation of dihaloacyl halides and other polyhalogenated by-products.

In accordance with the present invention, the solvent can constitute substantially all or only a minor portion of the reaction medium. The benefits of the present invention are most pronounced when the solvent weight ratio is high but substantial benefits are realized even when the solvent is present in relatively small amounts. The undesirable polyhalogenated acyl halides are formed only in minute amounts even when the reaction mass contains a low ratio of solvent and they are substantially excluded at the higher ratios. The weight ratio of the solvent to the sum of the solvent and the product, i.e., the solvent weight ratio, can vary from about 0.05:1 to about 0.99:1. In fact, during the normal course of a batch reaction, the solvent weight ratio diminishes with the formation of the product which becomes mixed with the solvent forming the reaction mass. In the practice of the continuous process, the solvent weight ratio can be maintained constant or varied to desired levels.

The invention will be more clearly understood from the following detailed description of specific examples thereof. In the examples and throughout the specification all proportions are expressed in parts by weight unless otherwise indicated.

EXAMPLE 1

About 149 parts (SOLVENT AMOUNT) of triethyl phosphate (SOLVENT) were charged into a suitable reaction vessel provided with a gas outlet, temperature recording means and two gas spargers below the level of the solvent. With the reaction vessel at 69 mm. of Hg pressure (PRESSURE) and with the reaction medium maintained at a temperature of approximately 14° to 16°C (TEMPERATURE), ketene (KETENE) and chlorine (HALOGENATING AGENT) were introduced through separate spargers at constant and substantially equimolar rates with the chlorine in sufficient excess that a slight trace of chlorine was detectable in the exhaust from the vacuum system. After about 3 hours, the addition of the reactants was terminated. At the termination of the reaction, the ratio of the solvent to the sum of the solvent and product was about 0.5. The reaction mixture contained essentially solvent, chloroacetyl chloride (HALOACYL CHLORIDE) and acetyl chloride. The reaction mixture contained only a trace, i.e., less than 0.1% of dichloroacetyl chloride (DIHALOACYL HALIDE) and other polychlorinated by-products. Upon distillation to separate the pure chloroacetyl chloride, the mole percent yield of chloroacetyl chloride was determined to be 97%, together with about 3% acetyl chloride. Analysis of the solvent fraction showed that about 147 grams of solvent were present. This high level of solvent recoverability indicates that negligible chlorination or other side reactions involving solvent occurred during the reaction leading to solvent loss.

Although in this example the reaction mass was not agitated, agitation is optional and can be used when needed depending upon reactor design and the choice of reactants, i.e., ketene and halogenating agent. When bromine is the halogenating agent, it is preferred to agitate the reaction mass but good results are also obtained without agitation.

Following the general procedure of Example 1 but with conditions and materials changed as noted in Table 1 the indicated products are obtained. The line titles of Table 1 are shown in parenthesis in the description of Example 1 where appropriate.

In Examples 3 through 5 the yield of haloacyl halide is high, i.e., above 90 percent, and the amount of dihaloacyl halide is minimized giving a haloacyl halide purity of greater than 95 percent. In Example 2 the yield of iodoacetyl chloride is about 80–90 percent. Diiodoacetyl chloride is extremely unstable and therefore is not found in the reaction mass of Example 2.

TABLE 1

| EXAMPLE NO. | 2 | 3 | 4 | 5 |
|---|---|---|---|---|
| SOLVENT | Triethyl phosphate | Tris-(2-chloroethyl)phosphate | Triethyl phosphate | Triethyl phosphate |
| PRESSURE (mm. Hg) | 100 | 100 | atmospheric | atmospheric |
| TEMPERATURE (C°) | 5–10 | 20 | 30 | 50 |
| KETENE | Ketene | Ketene | Methyl ketene | Phenyl ketene |
| HALOGENATING AGENT | Iodine monochloride | Chlorine | Chlorine | Chlorine |
| SOLVENT AMOUNT(parts) | 200 | 100 | 150 | 32 |
| HALOGEN AMOUNT (parts) | 179 | 85 | 148 | 22 |
| KETENE AMOUNT (parts) | 42 | 48 | 100 | 36 |
| HALOACYL HALIDE | Iodoacetyl chloride | Chloroacetyl chloride | Alphachloropropionyl chloride | Alphachlorophenylacetyl chloride |
| DIHALOACYL HALIDE | — | Dichloroacetyl chloride | Alpha, alpha-dichloropropionyl chloride | Alpha, alpha-dichlorophenylacetyl chloride |

Trimethyl phosphate, triphenyl phosphate, tri-2-methoxyethyl phosphate, diethyl propyl phosphate, tris-2-phenylethyl phosphate, tri-para-tolyl phosphate and ethyl ethylene phosphate may be substituted for triethyl phosphate as the solvent in Example 1 to give similar results.

EXAMPLE 6

To a reactor fitted with spargers and thermometer was added 158 parts of tri-n-butyl phosphate. Chlorine and ketene were sparged into the reactor at 73 mm. of Hg pressure with the temperature maintained at about 20°C for approximately 3 hours. The chlorine introduced into the reactor during this time was sufficient to maintain a slight excess with respect to the ketene. Analysis of the product gave the following results:

| | |
|---|---|
| Yield of chloroacetyl chloride (percent) | 89.7 |
| Purity (percent) | 99.4 |
| Yield of acetyl chloride (percent) | 9.8 |
| Yield of dichloroacetyl chloride (percent) | 0.4 |
| Solvent recovered (grams) | 153.2 |

In order to illustrate the advantages of the solvents of the present invention, the procedure of the foregoing Example 1 was substantially duplicated using other solvents over a range of reaction pressures. The percent yields thus obtained, together with the results of representative examples of this invention are tabulated below in Table II.

TABLE II

| Solvent | Chloroacetyl Chloride Yield (%) | Chloroacetyl Chloride Purity (%) | Acetyl Chloride Yield (%) | Dichloro-acetyl Chloride Yield(%) | Solvent Recovered (%) | Reactor Pressure (mm. of Hg) |
|---|---|---|---|---|---|---|
| Example 1 | 97 | 99.9 | 3 | 0.1 | 98.4 | 69 |
| Example 6 | 89.7 | 99.4 | 9.8 | 0.4 | 97 | 73 |
| Ethyl Acetate | 88 | 97.8 | 11 | 1.5 | 84 | 73 |
| Ethyl Acetate | 92 | 96 | 5 | 3 | 78 | atmospheric |
| Carbon Tetra-Chloride | 42 | 69 | 43 | 15 | 75 | atmospheric |
| 1,2-Dichloro-ethylene | 35 | 53 | 41 | 24 | 90 | atmospheric |
| Methyl Acetate | 91 | 94 | 4 | 4 | 88 | atmospheric |
| Acetonitrile | 46 | 83 | 47 | 7 | 66 | atmospheric |
| Nitromethane | 48 | 74 | 39 | 13 | 75 | atmospheric |
| n-Butyl Acetate | 82 | 95 | 15 | 3 | 84 | atmospheric |
| n-Hexyl Acetate | 81 | 95 | 15 | 4 | 83 | atmospheric |
| Benzonitrile | 87 | 94 | 9 | 4 | 92 | atmospheric |

By comparison of the same procedure utilizing other solvents, it is self-evident that the solvents of the present invention substantially suppress the formation of polychloroacetyl chlorides and minimize the formation of acetyl chloride. The separation of pure chloroacetyl chloride from acetyl chloride and the solvent by fractionation presents no problem because of the wide divergence in boiling points of these compounds.

The improvement effected by the solvents of the present invention is also evidenced in the better than 95% recovery of the solvent for recycle purposes. This provides greatly improved economy of operation. It is also evident from the high percent recovery of the solvent of this invention that the beneficial effect exerted by these solvents is due to the intrinsic nature of the chemical structure of the solvent.

The beneficial results of the present invention are obtained in like manner with other solvents of this invention as well as with the other aforementioned halogenating agents. Bromine can be introduced into the system as the liquid, combined with the solvent in solution, or in the gaseous state below the surface of the reaction mass. In most instances it is preferred to conduct brominations in accordance with this invention by using a solution of bromine in the solvent and then adding the resulting solution to the system.

Although the invention has been described with respect to specific modification, the details thereof are not to be construed as limitations except to the extent indicated in the following claims.

What is claimed is:

1. A process for the preparation of a monohaloacyl halide which comprises reacting a ketene selected from the group consisting of unsubstituted ketene, methyl ketene, dimethyl ketene, ethyl ketene, diethyl ketene, phenyl ketene and diphenyl ketene and a halogenating agent selected from the group consisting of chlorine, bromine, iodine, iodine monochloride, iodine monobromide and bromine monochloride in the presence of a solvent of the formula

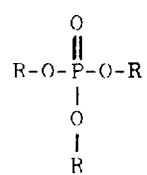

wherein each R is independently alkoxyalkyl, alkyl, substituted alkyl of the formula $-C_xH_{2x-y+1}R^1_y$ wherein $R^1$ is halo, phenyl, or substituted phenyl of the formula

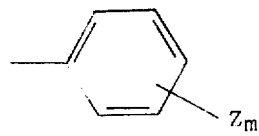

wherein each Z is independently halo, trihalomethyl, cyano, nitro, lower alkyl or lower alkoxy, and $m$ is an integer from 1 through 3, inclusive, provided that when each Z is nitro, $m$ cannot exceed 2, $x$ is an integer from 1 through 8, inclusive, and $y$ is an integer from 1 through 3, inclusive, phenyl or substituted phenyl of the formula

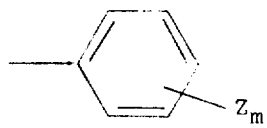

wherein each Z is independently halo, trihalomethyl, cyano, nitro, lower alkyl or lower alkoxy, and $m$ is an integer from 1 through 3, inclusive, provided that when each Z is nitro, $m$ cannot exceed 2 or two R's when taken together are alkylene of the empirical formula $C_nH_{2n}$ wherein $n$ is an integer from 2 through 8, inclusive, and having from two through four carbons, inclusive, in a continuous chain.

2. A process of claim 1 wherein each R is alkoxyalkyl.

3. A process of claim 1 wherein each R is substituted phenyl.

4. A process of claim 1 wherein each R is phenyl.

5. A process of claim 1 wherein each R is substituted alkyl.

6. A process in accordance with claim 1 wherein one R is alkyl and the two other R's, taken together, are alkylene.

7. A process in accordance with claim 1 wherein each R is alkyl.

8. A process in accordance with claim 1 wherein the halogenating agent is chlorine.

9. A process in accordance with claim 1 wherein the halogenating agent is bromine.

10. A process of claim 1 wherein the keter is unsubstituted ketene.

11. A process of claim 10 wherein the halogenating agent is chlorine.

12. The process of claim 11 wherein each R is alkyl.

13. The process of claim 1 wherein the solvent is tri-n-butyl phosphate.

14. The process of claim 1 wherein the solvent is tri-2-methoxyethyl phosphate.

15. The process of claim 1 wherein the solvent is tris-(2-chloroethyl) phosphate.

16. The process of claim 1 wherein the solvent is triethyl phosphate.

17. A process of claim 16 wherein the ketene is unsubstituted ketene.

18. A process of claim 17 wherein the halogen is chlorine.

19. Process according to claim 7 wherein said monohaloacyl halide is chloroacetyl chloride.

* * * * *